April 26, 1932.   W. HILDEBRAND ET AL   1,855,965
PLOWING MACHINE
Filed June 4, 1930    4 Sheets-Sheet 3
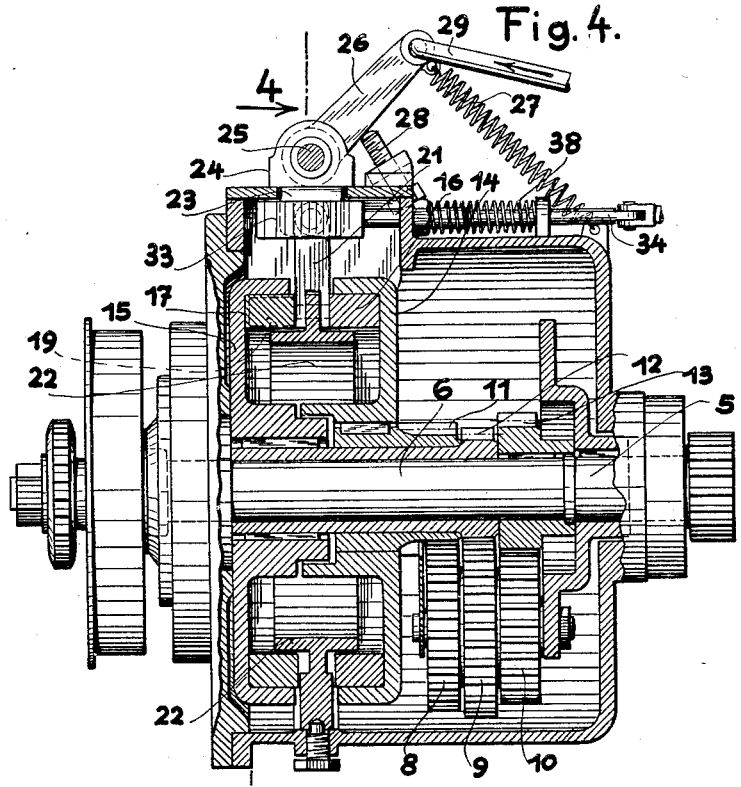
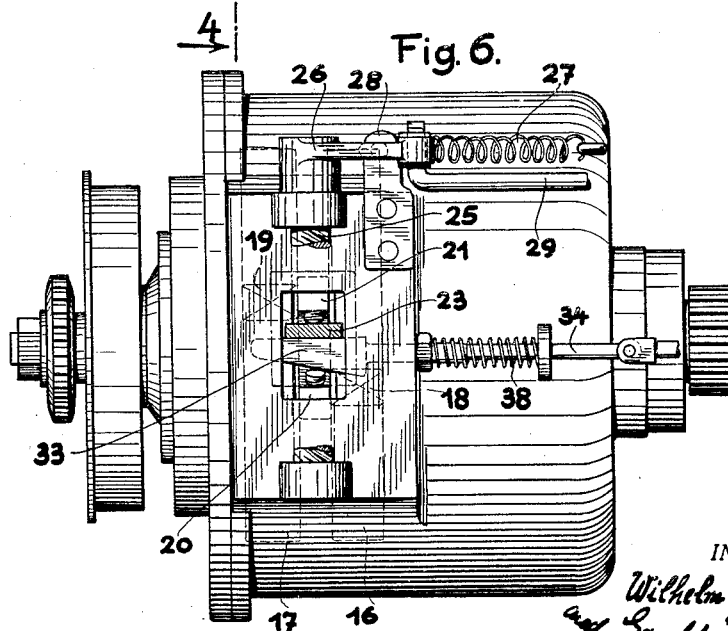
INVENTORS:
Wilhelm Hildebrand
and Ewald Hildebrand
By [signature], Attorney

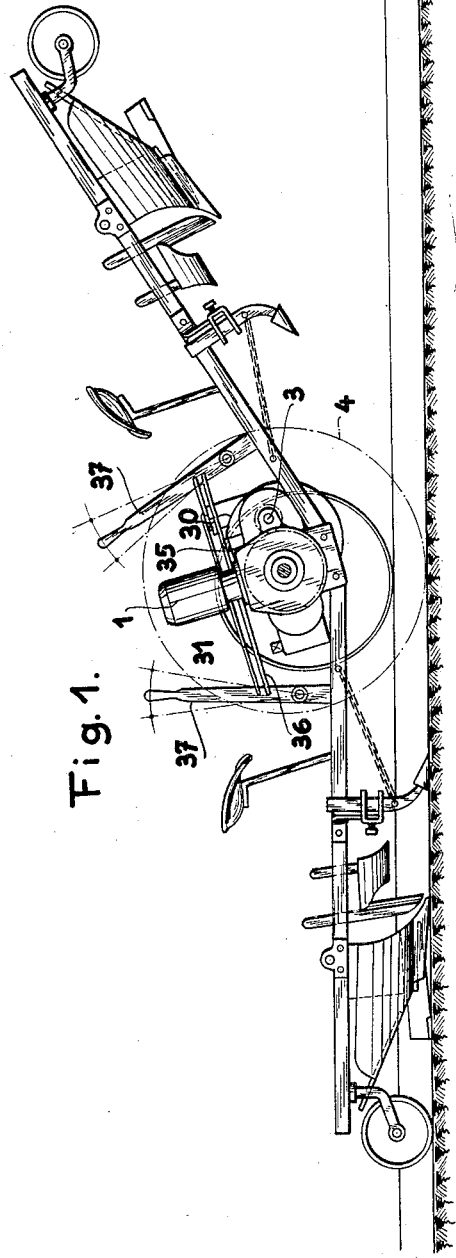

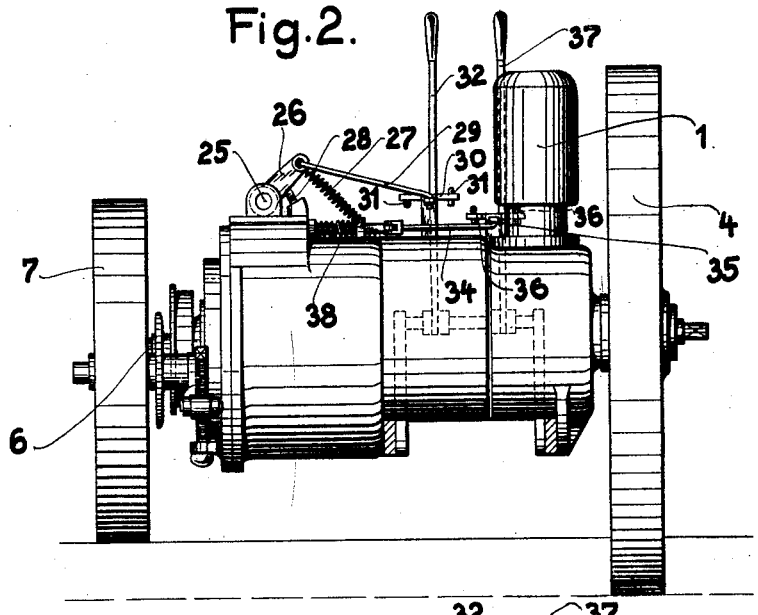
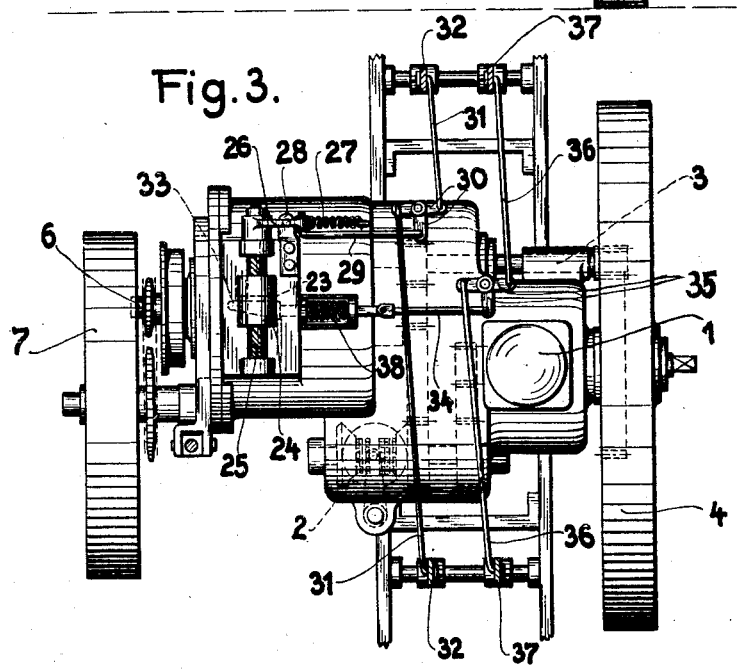

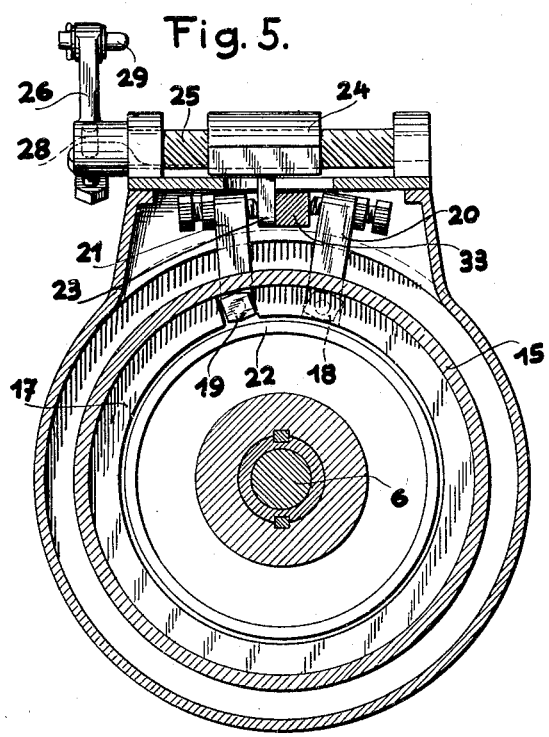
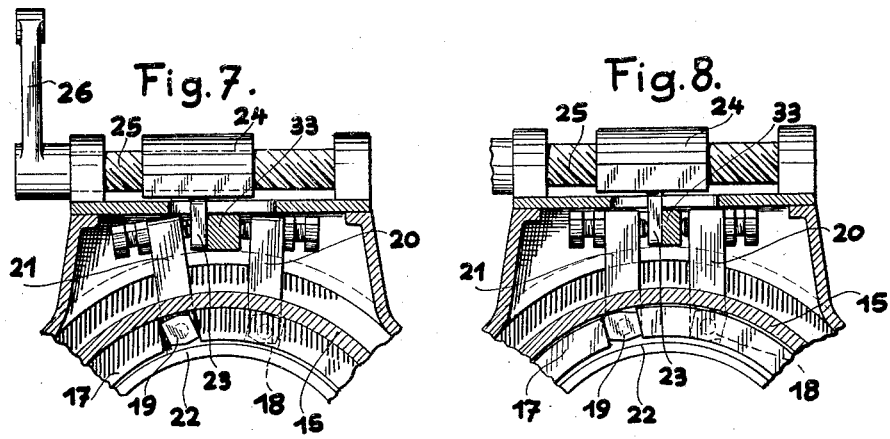

Patented Apr. 26, 1932

1,855,965

UNITED STATES PATENT OFFICE

WILHELM HILDEBRAND AND EWALD HILDEBRAND, OF UNNA, GERMANY

PLOWING MACHINE

Application filed June 4, 1930, Serial No. 459,248, and in Germany April 5, 1930.

This invention has reference to engine operated plows and in particular to so called tilting plows that is to say plows which are provided with at least one wheel adapted to move within the furrow and another smaller stabilizing so called ground wheel moving along the furrow and at the outside thereof, and among other objects the invention is intended to facilitate the operation and the control of the moving and actuating means of devices of the kind referred to and to increase the uniformity and reliability of operation thereof. Broadly considered the control and the regulation of the plow are effected in such a manner that the plow is forced to move in the forward and substantially straight direction by means of uniformly acting operating means for the driving wheels which are adapted for rather automatic action independently of the driver, while, for the purpose of turning the plow around the furrow wheel, motion acceleration means for the ground wheel are caused to act. On the other hand means are provided according to this invention for disengaging the operating means for the ground wheels, in case the plow is to be turned around said ground wheel, while after the release of the particular controlling means employed for the corresponding phase of movement of the plow the uniformly acting driving means for the pair of driving wheels are again brought into operation. Thus a great simplification and reliability of the operation of the controlling means will be produced which may therefore be manipulated with great ease even by absolutely unskilled attendants. Other advantages and objects will appear from the specification and the accompanying drawings.

The invention will be more fully described by reference to the drawings showing by way of exemplification an embodiment of the principles of the invention. Fig. 1 of the drawings is a side elevation of a plow to which this invention is applied; Fig. 2 shows the plow in front view; Fig. 3 is a plan view of the center part of the plow. In Figures 4 to 8 the change gear for the driving of the ground wheel is illustrated, partly in section and partly in elevation and corresponding to different positions of the movable parts.

By the operation of the engine 1 and by means of a reversing gear 2 the shaft 3 for the driving of the large plow wheel 4 and the shafts 5 and 6 for the driving of the small ground wheel 7 are operated. Between the shafts 5 and 6 a system of planet gears may be disposed in order to be able to modify the operating speed of the shaft 6 and to entirely disengage the driving means for this shaft whenever necessary. The planetary train of gears comprises for instance wheels 8, 9, 10 which are connected to the shaft 5, while the differential gears 11, 12 are connected to the coupling discs 14, 15. If the coupling disc 14 is arrested the shaft 6 is operated by means of the wheels 11, 8, 10 and 13 in such a manner, that the furrow wheel and the ground wheel are operated with the same peripheral velocity. In case however the coupling disc 15 is arrested, the driving of the shaft 6 will be effected by way of the wheels 12, 9, 10 and 13, so that an increased peripheral velocity will thereby be imparted to the ground wheel 7. The arresting of the coupling discs 14, 15 may be effected by spreadable rings 16, 17 or the like which are operated by means of spreading cudgels 18, 19 and levers 20, 21 or by equivalent means which are secured to a stationary ring 22 and the movements of which may be controlled by the projection 23 of the threaded nut 24. This nut is disposed upon a screw shaft 25 which is connected to a lever 26 which latter is pulled by means of a spring 27 against an adjustable stop 28 and is connected to hand levers 32 by link connection 29, 30, 31. Between the projection or extension 23 of the nut 24 and the lever 20 a wedge 33 is adapted to engage, which is connected to the hand levers 37 by link- or lever-connection 34, 35, 36. A spring 38 tends to move the wedge 33 inwards.

In the position of the parts according to Figures 1 to 6 the coupling means for the uniform driving of the furrow wheel 4 and of the ground wheel 7 are engaged, inasmuch as the coupling disc 14 is arrested by the spreading lever 20. When the link connections 29 to 31 are displaced in the direction of the arrow of Fig. 4 by the operation of one of the hand levers 32, the nut 24 is moved from the position of Fig. 5 into the position of Fig. 7 towards the left by the turning of the rod or spindle 29 and the operation of the lever 26. The wedge 33 is thereby caused to participate in this movement, while the coupling disc 14 is rendered inoperative and the coupling disc 15 is arrested. In consequence thereof the driving means for the increase of speed of the ground wheel 7 has become engaged, so that the plow is turned towards the side of the large furrow wheel, that is to say towards the right in accordance with the representation of Fig. 3. Upon then releasing the hand lever 32 the spring 27 will cause the entire system of link members 25 to 31 to return to its position of rest in accordance with Figures 1–6 by which means the nut 24 will be again displaced towards the right and the position of the levers 20, 21 according to Fig. 5 is restored. It will thus be seen, that the driving means for the increased velocity of the ground wheel will again become automatically disengaged, while the uniform driving for the two wheels 4, 7 is automatically restored, so that the plow immediately after the release of the hand lever 32 will be again adjusted, so that the driving wheels will produce a straight forward movement automatically without necessitating any action on the part of the driver. If, however, by means of one of the manually operated levers 37 the wedge 33 is withdrawn contrary to the action of the spring 38, the two spreading levers 20, 21 are turned into the position shown in Fig. 8 in which the two coupling discs 14, 15 are out of engagement. In this position of the parts there are no driving means acting upon the ground wheel 7, so that the plow will now be turned in the direction of the ground wheel, that is to say towards the left hand side of Fig. 3. After the hand lever 37 has been released, the spring 38 will again force the wedge 33 forward which will cause the spreading lever 20 to be turned and the driving means for the uniform turning of the driving wheels to be automatically operated. Thus the plow is again automatically restored to a position corresponding to the straight forward movement thereof. In view of the employment of the wedge 23 there is no idle movement whatever when the levers 20, 21 are switched from one velocity to the other.

It will have to be understood that the invention is not limited to the particular kind of combinations of parts herein shown and described merely by way of illustration and exemplification, and changes and deviations are possible within the scope of the invention as defined by the appended claims.

We claim:—

1. In a plowing machine, a furrow wheel and a steering wheel oppositely disposed, a connecting shaft for said wheels, two ring shaped clutching means on said shaft, driving means for the steering wheel, engageable with either of said clutching means, driving means for the furrow wheel, and a planetary gearing intermediate the driving means for said wheels and engageable with either of said driving means, brake bands on said clutching means, stretching levers engaging said brake bands, a spring actingly displaceable operating member projecting between said levers, and an axially and spring-actingly displaceable wedge projecting between the operating member and one of said levers.

2. In a plowing machine, a furrow wheel and a steering wheel oppositely disposed, two adjacently disposed clutches for ring shaped, one of said wheels, gearing intermediate the clutches and the other wheel, and engageable with the clutches, brake bands for each of said clutches, gripping and stretching levers for said bands, a slidable operating member between the levers, a spring actuated wedge between one of said levers and the operating member, and spring actuated means on said operating member pulling said member in a certain direction.

In testimony whereof we affix our signatures.

WILHELM HILDEBRAND.
EWALD HILDEBRAND.